(12) United States Patent
Takano et al.

(10) Patent No.: US 12,327,836 B2
(45) Date of Patent: Jun. 10, 2025

(54) ALL-SOLID-STATE BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Akisuke Ito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 799 days.

(21) Appl. No.: 16/849,215

(22) Filed: Apr. 15, 2020

(65) Prior Publication Data

US 2020/0259213 A1 Aug. 13, 2020

Related U.S. Application Data

(63) Continuation of application No. PCT/JP2018/041428, filed on Nov. 8, 2018.

(30) Foreign Application Priority Data

Nov. 13, 2017 (JP) .................. 2017-218081

(51) Int. Cl.
*H01M 10/0562* (2010.01)
*H01M 4/485* (2010.01)
*H01M 10/0525* (2010.01)
*H01M 10/058* (2010.01)

(52) U.S. Cl.
CPC ....... *H01M 10/0562* (2013.01); *H01M 4/485* (2013.01); *H01M 10/0525* (2013.01); *H01M 10/058* (2013.01); *H01M 2300/0074* (2013.01)

(58) Field of Classification Search
None
See application file for complete search history.

(56) References Cited

U.S. PATENT DOCUMENTS

| | | | |
|---|---|---|---|
| 9,559,396 B2* | 1/2017 | Lee | H01M 12/08 |
| 2011/0003212 A1 | 1/2011 | Sato et al. | |
| 2015/0044575 A1* | 2/2015 | Kawaji | H01M 10/052 252/62.2 |

(Continued)

FOREIGN PATENT DOCUMENTS

| | | |
|---|---|---|
| CN | 105375027 A | 3/2016 |
| EP | 3 067 979 A2 | 9/2016 |

(Continued)

OTHER PUBLICATIONS

Kuwano et al., Yogyo Kyokai Shi, No. 95, 2, p. 38-43, 1987. (Year: 1987).*

(Continued)

*Primary Examiner* — Eli S Mekhlin
(74) *Attorney, Agent, or Firm* — ArentFox Schiff LLP (57) ABSTRACT

An all-solid-state battery having a positive electrode, a negative electrode having a negative electrode active material layer, and a solid electrolyte layer between the positive electrode and the negative electrode material layer. The negative electrode active material layer contains 60% by volume or more of an oxide having a LISICON-type crystal structure. The solid electrolyte layer contains a solid electrolyte having at least one of an oxide having a garnet-type crystal structure or an oxide having a LISICON-type crystal structure.

13 Claims, 1 Drawing Sheet

(56) References Cited

U.S. PATENT DOCUMENTS

| | | |
|---|---|---|
| 2016/0043399 A1 | 2/2016 | Koga |
| 2016/0344032 A1 | 11/2016 | Shibata et al. |
| 2017/0222254 A1 | 8/2017 | Sakamoto et al. |
| 2018/0277890 A1 | 9/2018 | Ueda et al. |

FOREIGN PATENT DOCUMENTS

| | | | |
|---|---|---|---|
| JP | 2009129790 A | | 6/2009 |
| JP | 2009170401 A | | 7/2009 |
| JP | 2013037992 A | | 2/2013 |
| JP | 2014002855 A | * | 1/2014 |
| JP | 2015011829 A | | 1/2015 |
| JP | 201666584 A | | 4/2016 |
| JP | 2017183115 A | | 10/2017 |
| JP | 2017188441 A | | 10/2017 |
| WO | 2018059492 A1 | | 4/2018 |

OTHER PUBLICATIONS

Hayamizu et al., Solid State Nucl. Magn. Reson., 2015, EPub, May 2015. (Year: 2015).*

Yada et al. Journal of the Electrochemical Society, 153 (6) A1148-A1153 (2006). (Year: 2006).*

Kuwano, J. et al.; "Synthesis of Lithium Ion Conductor, $Y_{II}$—$Li_{3.4}Si_{0.4}V_{0.6}O_4$, by the Alkoxide Method"; Yogyo-Kyokai-Shi., 1987, vol. 95 No. 2, pp. 176-181 (abstract only).

Bruce, P.G. et al.; "Ion Conductivity of LISICON Solid Solutions $Li_{2+2x}Zn_{1-x}Ge_{O4}$"; Journal of Solid State Chemistry, May 31, 1982, vol. 44, pp. 354-365.

International Search Report Issued for PCT/JP2018/041428, date of mailing Jan. 29, 2019.

Written Opinion of the International Searching Authority issued for PCT/JP2018/041428, date of mailing Jan. 29, 2019.

Extended Supplementary European Search Report issued for EP 18 87 5638, date of mailing Sep. 22, 2021.

* cited by examiner

ALL-SOLID-STATE BATTERY

CROSS REFERENCE TO RELATED APPLICATIONS

The present application is a continuation of International application No. PCT/JP2018/041428, filed Nov. 8, 2018, which claims priority to Japanese Patent Application No. 2017-218081, filed Nov. 13, 2017, the entire contents of each of which are incorporated herein by reference.

FIELD OF THE INVENTION

The present invention relates to an all-solid-state battery.

BACKGROUND OF THE INVENTION

Conventionally, all-solid-state batteries are known as a battery excellent in reliability and safety. For example, Non-Patent Document 1 describes an all-solid-state battery including an oxide having a LISICON-type crystal structure as a solid electrolyte.
Non-Patent Document 1: P. G. Bruce et. Al., J. solidstate chem., 44 (1982), 354-365.

SUMMARY OF THE INVENTION

In recent years, there has been an increasing demand for enhancing the energy density of an all-solid-state battery.

A main object of the present invention is to provide an all-solid-state battery having a high energy density.

The all-solid-state battery according to the present invention includes a positive electrode, a negative electrode having a negative electrode active material layer, and a solid electrolyte layer between the positive electrode and the negative electrode material layer. The negative electrode active material layer contains 60% by volume or more of an oxide having a LISICON-type crystal structure. The solid electrolyte layer contains a solid electrolyte having at least one of an oxide having a garnet-type crystal structure or an oxide having a LISICON-type crystal structure.

BRIEF EXPLANATION OF THE DRAWING

The FIGURE a schematic sectional view of an all-solid-state battery according to one embodiment of the present invention.

DETAILED DESCRIPTION OF THE INVENTION

Figure 1:
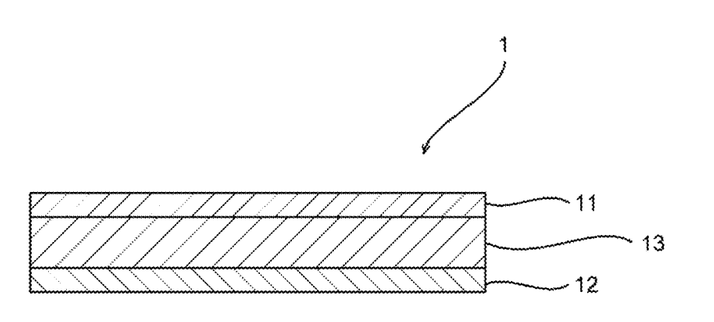

Hereinafter, an example of a preferred embodiment of the present invention will be described. Note that the embodiment described below is merely an example. The present invention is not at all limited to the embodiment described below.

The FIGURE a schematic sectional view of a co-fired all-solid-state battery 1 according to the present embodiment.

As shown in the FIGURE, a positive electrode 11, a negative electrode 12 having a negative electrode active material layer, and a solid electrolyte layer 13 between the positive electrode 11 and the negative electrode 12. The solid electrolyte layer 13 is provided on the negative electrode 12. Specifically, the solid electrolyte layer 13 is provided on the negative electrode active material layer. The solid electrolyte layer 13 is also in contact with the negative electrode 12. The positive electrode 11 is provided on the solid electrolyte layer 13. The positive electrode 11 is in contact with the solid electrolyte layer 13. That is, the solid electrolyte layer 13 is sandwiched between the positive electrode 11 and the negative electrode 12. Each of the positive electrode 11 and the negative electrode 12 is joined to the solid electrolyte layer 13 by sintering. That is, the positive electrode 11, the solid electrolyte layer 13, and the negative electrode 12 are an integrally sintered body.

(Positive Electrode 11)

The positive electrode 11 contains a positive electrode active material grain. Examples of the preferably used positive electrode active material grain include lithium-containing phosphate compound grains having a NASICON-type structure, lithium-containing phosphate compound grains having an olivine-type structure, lithium-containing layered oxide grains, and lithium-containing oxide grains having a spinel-type structure. Specific examples of the preferably used lithium-containing phosphate compound having a NASICON-type structure include $Li_3V_2(PO_4)_3$. Specific examples of the preferably used lithium-containing phosphate compound having an olivine-type structure include $Li_3Fe_2(PO_4)_3$ and $LiMnPO_4$. Specific examples of the preferably used lithium-containing layered oxide grains include $LiCoO_2$ and $LiCo_{1/3}Ni_{1/3}Mn_{1/3}O2$. Specific examples of the preferably used lithium-containing oxide having a spinel-type structure include $LiMn_2O_4$, $LiNi_{0.5}Mn_{1.5}O_4$, and $Li_4Ti_5O_{12}$. Among the positive electrode active material grains, in the present embodiment in which the negative electrode active material and the garnet-type solid electrolyte described below are used, the lithium-containing layered oxides such as $LiCoO_2$ and $LiCo_{1/3}Ni_{1/3}Mn_{1/3}O_2$ are more preferably used. Only one of the positive electrode active material grains may be used, or a plurality of the positive electrode active material grains may be mixed and used.

The positive electrode 11 may further contain a solid electrolyte. The type of the solid electrolyte contained in the positive electrode 11 is not particularly limited, and the positive electrode 11 preferably contains the same solid electrolyte as the solid electrolyte contained in the solid electrolyte layer 13 described below.

The positive electrode 11 may further contain, for example, a conductive auxiliary agent, a sintering auxiliary agent, and the like in addition to the positive electrode active material grain.

Examples of the preferably used conductive auxiliary agent include metal materials such as Ag, Au, Pd, Pt, Cu, and Sn, and carbon materials such as acetylene black, Ketjen black, Super P (registered trademark), and carbon nanotubes such as VGCF (registered trademark).

The preferably used sintering auxiliary agent contains Li, M, and O (M is at least one element excluding Li and O), that is, the preferably used sintering auxiliary agent is a complex oxide of Li and M (M is at least one element excluding Li and O). The sintering auxiliary agent more preferably contains Li, B, and O, that is, the sintering auxiliary agent is more preferably a complex oxide containing Li and B.

Specific examples of the complex oxide containing Li and B include $Li_3BO_3$, $Li_4B_2O_5$, $LiBO_2$, and $Li_{2+x}C_{1-x}B_xO_3$ $(0<X<1)$.

In the present invention, the positive electrode may include a positive electrode active material layer, or may include a laminate of a current collector and a positive electrode active material layer.

(Negative Electrode 12)

The negative electrode 12 has the negative electrode active material layer. The negative electrode active material layer contains 60% by volume or more of an oxide having a LISICON-type crystal structure. The negative electrode active material layer preferably contains 65% by volume or more of an oxide having a LISICON-type crystal structure, and more preferably 70% by volume or more. The negative electrode active material layer may include, for example, only an oxide having a LISICON-type crystal structure.

The oxide having a LISICON-type crystal structure contained in the negative electrode active material layer is preferably represented by a chemical formula of $(Li_{[3-ax+(5-b)y]}A_x)(V_{(1-y)}B_y)O_4$, wherein A is at least one element selected from the group consisting of Na, K, Mg, Ca, Al, Ga, Zn, Fe, Cr, and Co, B is at least one element selected from the group consisting of Zn, Al, Ga, Si, Ge, Sn, P, As, Ti, Mo, W, Fe, Cr, and Co, $0 \leq x \leq 1.0$, $0 \leq y \leq 0.6$, a represents a valence of A, and b represents a valence of B.

In the chemical formula, it is more preferable that $0 \leq x \leq 0.2$ and $0.1 \leq y \leq 0.4$. By setting $0.1 \leq y$, the utilization rate of the oxide having a LISICON-type crystal structure that functions as a negative electrode active material can be increased. By setting $y \leq 0.4$, the initial reversible capacity can be increased.

The negative electrode active material layer may further contain a conductive auxiliary agent and a sintering auxiliary agent in addition to the oxide having the LISICON-type crystal structure.

Examples of the preferably used conductive auxiliary agent include metal materials such as Ag, Cu, Ni, and Sn, and carbon materials such as carbon nanofibers, acetylene black, and Ketjen black. Among the conductive auxiliaries, Ag and the carbon materials are more preferably used. This is because Ag and the carbon materials hardly cause a side reaction with the oxide having a LISICON-type crystal structure during the sintering.

Examples of the preferably used sintering auxiliary agent include a boron-lithium complex oxide having a molar ratio of Li to B (Li/B) of 2.0 or more.

Specific examples of the preferably used sintering auxiliary agent include $Li_3BO_3$, $B_2O_3$, $Li_{2.4}Al_{0.2}BO_3$, $Li_{2.2}C_{0.8}B_{0.2}O_3$, and $Li_4B_2O_5$.

In the present invention, the negative electrode may include the negative electrode active material layer, or may include a laminate of a current collector and the negative electrode active material layer.

(Solid Electrolyte Layer 13)

The solid electrolyte layer 13 contains a solid electrolyte having at least one of an oxide having a garnet-type crystal structure or an oxide having a LISICON-type crystal structure.

The oxide having a LISICON-type crystal structure as the solid electrolyte is, for example, represented by a chemical formula of $(Li_{[3-ax+(5-b)y]}A_x)(V_{(1-y)}B_y)O_4$ wherein A is at least one element selected from the group consisting of Na, K, Mg, Ca, Al, Ga, Zn, Fe, Cr, and Co, B is at least one element selected from the group consisting of Zn, Al, Ga, Si, Ge, Sn, P, As, Ti, Mo, W, Fe, Cr, and Co, $0 \leq x \leq 1.0$, $0 \leq y \leq 0.6$, a represents a valence of A, and b represents a valence of B. In the chemical formula, it is more preferable that $0 \leq x \leq 0.2$ and $0.1 \leq y \leq 0.4$.

Specific examples of the preferably used oxide having a LISICON-type crystal structure include $Li_{3.2}(V_{0.8}Si_{0.2})O_4$, $Li_{3.4}(V_{0.6}Si_{0.4})O_4$, $Li_{3.2}(V_{0.8}Ge_{0.2})O_4$, $Li_{3.5}(Ge_{0.5}P_{0.5})O_4$, $Li_{3.5}(P_{0.5}Si_{0.5})O_4$, and $(Li_{3.3}Al_{0.03})(V_{0.6}Si_{0.4})O_4$.

The oxide having a garnet-type structure is, for example, a solid electrolyte represented by a composition formula of $(Li_{[7-ax-(b-4)y]}A_x) La_3Zr_{(2-y)}B_yO_{12}$ wherein A is at least one element selected from the group consisting of Ga, Al, Mg, Zn, and Sc, B is at least one element selected from the group consisting of Nb, Ta, W, Te, Mo, and Bi, $0 \leq x \leq 0.5$, $0 \leq y \leq 2.0$, a represents an average valence of A, and b represents an average valence of B.

Specific examples of the preferably used oxide having a garnet-type structure include $(Li_{6.4}Ga_{0.05}Al_{0.15})La_3Zr_2O_{12}$, $(Li_{6.4}Al_{0.2})$ $La_3Zr_2O_{12}$, $(Li_{6.4}Ga_{0.15}Sc_{0.05})$ $La_3Zr_2O_{12}$, $Li_{6.75}La_3$ $(Zr_{1.75}Nb_{0.25})O_{11}$, $(Li_{6.45}Al_{0.1})La_3$ $(Zr_{1.75}Nb_{0.25})$ $O_{12}$, $(Li_{6.175}Al_{0.1})La_3(Zr_{1.475}Ta_{0.105}Bi_{0.42})O_{12}$, and $Li_{6.6}La_3$ $(Zr_{1.6}Ta_{0.4})O_{12}$.

The solid electrolyte layer 13 may further contain a component other than the garnet-type solid electrolyte and the LISICON-type solid electrolyte. The component is not particularly limited, and preferably causes no side reaction with each of the garnet-type solid electrolyte, the LISICON-type solid electrolyte, and a compound containing Li and B during the co-firing. Examples of the preferably used component include compounds containing Li and B, $ZrO_2$, $Al_2O_3$, Li—Zr—O-based compounds, Li—Al—O-based compounds, and $La_2Zr_2O_7$.

As described above, in the all-solid-state battery 1 according to the present embodiment, the negative electrode active material layer contains 60% by volume or more of the oxide having a LISICON-type crystal structure, and the solid electrolyte layer 13 contains a solid electrolyte having at least one of the oxide having a garnet-type crystal structure or the oxide having a LISICON-type crystal structure. Therefore, as can be seen from the Examples and Comparative Examples described below, the all-solid-state battery 1 has a high energy density. It is thought that the reason is that the oxide having a LISICON-type crystal structure functions as a negative electrode active material and has a high ionic conductivity, so that there is no need to separately add a solid electrolyte, and the content of the negative electrode active material in the negative electrode active material layer can be increased. It is also thought that the reason is that the solid electrolyte layer 13 contains a solid electrolyte having at least one of the oxide having a garnet-type crystal structure or the oxide having a LISICON-type crystal structure, so that the charge mobility between the oxide having a LISICON-type crystal structure contained in the negative electrode active material layer and the solid electrolyte layer can be increased.

(Method for Manufacturing all-Solid-State Battery 1)

Next, an example of a method for manufacturing the all-solid-state battery 1 will be described.

First, in an active material grain and a solid electrolyte, a solvent, a resin, and the like are appropriately mixed to prepare a paste. The paste is applied to a sheet and dried to form a first green sheet for forming the positive electrode 11.

In an oxide having a LISICON-type crystal structure, a solvent, a resin, and the like are appropriately mixed to prepare a paste. The paste is applied to a sheet and dried to form a second green sheet for forming the negative electrode 12.

The first and the second green sheets may contain a conductive auxiliary agent, a sintering auxiliary agent, and the like.

In a solid electrolyte, a solvent, a resin, and the like are appropriately mixed to prepare a paste. The paste is applied and dried to produce a third green sheet for forming the solid electrolyte layer 13.

Next, the first to third green sheets are appropriately stacked to produce a laminate. The produced laminate may be pressed. Preferable examples of the method for pressing include an isostatic pressing method.

Thereafter, the laminate is sintered to obtain the all-solid-state battery 1.

Hereinafter, the present invention will be described in more detail with reference to specific examples. However, the present invention is not limited to the following examples, and the present invention can be implemented with appropriate modifications as long as the gist of the present invention is not modified.

Comparative Example 1

[Preparation of Solid Electrolyte Powder]

Raw materials such as lithium hydroxide monohydrate ($LiOH.H_2O$), gallium oxide ($Ga_2O_3$), aluminum oxide ($Al_2O_3$), lanthanum hydroxide ($La(OH)_3$), and zirconium oxide ($ZrO_2$) were weighed so that the solid electrolyte had the composition shown in Table 1 below. Next, water was added, the resulting mixture was sealed in a 100 ml polyethylene polypot, and the polypot was rotated on a pot rack at 150 rpm for 16 hours to mix the raw materials. Note that 3% by mass of excess lithium hydroxide monohydrate ($LiOH.H_2O$) as a Li source was put based on the target composition in consideration of Li deficiency at the time of sintering.

Next, the resulting slurry was dried, and then pre-fired at 900° C. for 5 hours. Next, to the resulting pre-fired product, a toluene-acetone mixed solvent was added, and the resulting mixture was ground with a planetary ball mill for 6 hours to obtain a solid electrolyte powder having the composition shown in Table 1.

Next, the obtained solid electrolyte powder, a butyral resin, and an alcohol were mixed at a weight ratio of 200:15:140, and then the alcohol was removed on a hot plate at 80° C. to obtain a mixed powder covered with the butyral resin serving as a binder.

Next, the mixed powder covered with the butyral resin was pressed at 90 MPa using a tableting machine to form a tablet. The obtained tablet was heated to 500° C. in an oxygen atmosphere to remove the butyral resin. Then, the resulting product was fired at 750° C. to 1200° C. for 3 hours in an air atmosphere. Then, after cooled to room temperature, the surface was polished to obtain a sintered tablet of the solid electrolyte having a garnet-type crystal structure.

[Preparation of Negative Electrode Active Material Powder]

Lithium hydroxide monohydrate ($LiOH.H_2O$) and vanadium pentoxide ($V_2O_5$) were weighed so that the negative electrode active material powder had the composition shown in Table 1 below. Next, water was added, the resulting mixture was sealed in a 100 ml polyethylene polypot, and the polypot was rotated on a pot rack at 150 rpm for 16 hours to mix the raw materials.

Next, the resulting slurry was dried, and then pre-fired at 800° C. for 5 hours in an air atmosphere.

Next, to the resulting pre-fired powder, an alcohol was added, the resulting mixture was sealed in a 100 ml polyethylene polypot, and the polypot was rotated on a pot rack at 150 rpm for 16 hours to grind the resulting mixture. Thereafter, the ground powder was fired at 900° C. for 5 hours.

Next, to the resulting fired powder, a toluene-acetone mixed solvent was added, and the resulting mixture was ground using a planetary ball mill for 6 hours and dried to prepare a negative electrode active material powder.

[Preparation of All-Solid-State Battery]

To the negative electrode active material powder prepared as described above and Ag as a conductive auxiliary agent, an alcohol and a binder were added, and the resulting mixture was kneaded to prepare a negative electrode mixture paste. The negative electrode mixture paste was applied to the sintered tablet prepared as described above and dried. Thereafter, the resulting product was heated to 400° C. to remove the binder, and then heat-treated at 750° C. to 800° C. for 3 hours to form a negative electrode active material layer on one main surface of the sintered tablet.

Next, metal Li was adhered to the other main surface of the sintered tablet as a counter and reference electrode, and sealed with a 2032 type coin cell to prepare an all-solid-state battery.

Examples 1 to 8

[Preparation of Solid Electrolyte Powder]

A solid electrolyte powder was prepared in the same manner as in Comparative Example 1.

[Preparation of Negative Electrode Active Material Powder]

A negative electrode active material powder was prepared in the same manner as in Comparative Example 1 except that lithium hydroxide monohydrate ($LiOH.H_2O$), vanadium pentoxide ($V_2O_5$), and silicon oxide ($SiO_2$) were weighed so that the negative electrode active material had the composition shown in Table 1 below.

[Preparation of All-Solid-State Battery]

An all-solid-state battery was prepared in the same manner as in Comparative Example 1.

Example 9

[Preparation of Solid Electrolyte Powder]

A solid electrolyte powder was prepared in the same manner as in Comparative Example 1.

[Preparation of Negative Electrode Active Material Powder]

A negative electrode active material powder was prepared in the same manner as in Comparative Example 1 except that lithium hydroxide monohydrate ($LiOH.H_2O$), vanadium pentoxide ($V_2O_5$), and germanium oxide ($GeO_2$) were weighed so that the negative electrode active material had the composition shown in Table 1 below.

[Preparation of All-Solid-State Battery]

An all-solid-state battery was prepared in the same manner as in Comparative Example 1.

Example 10

[Preparation of Solid Electrolyte Powder]

A solid electrolyte powder was prepared in the same manner as in Comparative Example 1.

[Preparation of Negative Electrode Active Material Powder]

A negative electrode active material powder was prepared in the same manner as in Comparative Example 1 except that lithium hydroxide monohydrate ($LiOH.H_2O$), vanadium pentoxide ($V_2O_5$), and titanium oxide ($TiO_2$) were weighed so that the negative electrode active material had the composition shown in Table 1 below.

[Preparation of All-Solid-State Battery]

An all-solid-state battery was prepared in the same manner as in Comparative Example 1.

Example 11

[Preparation of Solid Electrolyte Powder]

A solid electrolyte powder was prepared in the same manner as in Comparative Example 1.

[Preparation of Negative Electrode Active Material Powder]

A negative electrode active material powder was prepared in the same manner as in Comparative Example 1 except that lithium hydroxide monohydrate ($LiOH \cdot H_2O$), vanadium pentoxide ($V_2O_5$), and phosphorus oxide ($P_2O_5$) were weighed so that the negative electrode active material had the composition shown in Table 1 below.

[Preparation of All-Solid-State Battery]

An all-solid-state battery was prepared in the same manner as in Comparative Example 1.

Example 12

[Preparation of Solid Electrolyte Powder]

A solid electrolyte powder was prepared in the same manner as in Comparative Example 1.

[Preparation of Negative Electrode Active Material Powder]

A negative electrode active material powder was prepared in the same manner as in Comparative Example 1 except that lithium hydroxide monohydrate ($LiOH \cdot H_2O$), aluminum oxide ($Al_2O_3$), vanadium pentoxide ($V_2O_5$), and silicon oxide ($SiO_2$) were weighed so that the negative electrode active material had the composition shown in Table 1 below.

[Preparation of All-Solid-State Battery]

An all-solid-state battery was prepared in the same manner as in Comparative Example 1.

(Evaluation)

The all-solid-state batteries prepared in Examples 1 to 12 and Comparative Example 1 were subjected to a constant current discharging test at a current density corresponding to 0.05 It and a potential range of 0.3 V to 3.0 V (vs. $Li/Li^+$). From the result, the initial reversible capacity was calculated by dividing the determined initial reversible electricity amount by the mass of the negative electrode active material.

Furthermore, the theoretical capacity was defined as the capacity when the two-electron reaction of V in the negative electrode active material proceeded, and the utilization rate was calculated by dividing the initial reversible capacity by the theoretical capacity.

TABLE 1

| | Negative electrode | | | | |
|---|---|---|---|---|---|
| | Negative electrode active material | Conductive auxiliary | Sintering auxiliary | Negative electrode active material (vol %) | Conductive auxiliary (vol %) |
| Comparative Example 1 | $Li_3VO_4$ β II-$Li_3VO_4$-type | Ag | — | 60 | 40 |
| Example 1 | $Li_{3.06}(V_{0.05}Si_{0.05})O_4$ LISICON-type | Ag | — | 60 | 40 |
| Example 2 | $Li_{3.1}(V_{0.2}Si_{0.1})O_4$ LISICON-type | Ag | — | 70 | 30 |
| Example 3 | $Li_{3.19}(V_{0.86}Si_{0.14})O_4$ LISICON-type | Ag | — | 30 | 40 |
| Example 4 | $Li_{3.2}(V_{0.8}Si_{0.2})O_4$ LISICON-type | Ag | — | 60 | 40 |
| Example 5 | $Li_{3.2}(V_{0.8}Si_{0.3})O_4$ LISICON-type | Ag | — | 60 | 40 |
| Example 6 | $Li_{3.4}(V_{0.5}Si_{0.4})O_4$ LISICON-type | Ag | — | 60 | 40 |
| Example 7 | $Li_{1.5}(V_{0.5}Si_{0.5})O_4$ LISICON-type | Ag | — | 60 | 40 |
| Example 8 | $Li_{3.8}(V_{0.4}Si_{0.6})O_4$ LISICON-type | Ag | — | 60 | 40 |
| Example 9 | $Li_{3.2}(V_{0.8}Ge_{3.2})O_4$ LISICON-type | Ag | — | 60 | 40 |
| Example 10 | $Li_{3.5}(V_{0.7}Ti_{0.3})O_4$ LISICON-type | Ag | — | 60 | 40 |
| Example 11 | $Li_{0.00}(V_{0.7}P_{0.3})O_4$ LISICON-type | Ag | — | 60 | 40 |
| Example 12 | $(Li_{3.1}Al_{0.03})(V_{0.9}Si_{0.2})O_4$ LISICON-type | Ag | — | 60 | 40 |

| | Negative electrode Sintering auxiliary (vol %) | Solid electrolyte layer | Initial reversible capacity (mAh/g) | Utilization rate (%) |
|---|---|---|---|---|
| Comparative Example 1 | 0 | $(Li_{6.4}Ga_{0.05}Al_{0.15})La_3Zr_2O_{12}$ garnet-type | 5 or less | — |
| Example 1 | 0 | $(Li_{6.4}Ga_{0.05}Al_{0.15})La_2Zr_2O_{13}$ garnet-type | 40 | 11 |
| Example 2 | 0 | $(Li_{6.4}Ga_{0.05}Al_{0.15})La_3Zr_2O_{12}$ garnet-type | 191 | 53 |
| Example 3 | 0 | $(Li_{6.4}Ga_{0.05}Al_{0.15})La_3Zr_2O_{12}$ garnet-type | 220 | 64 |

TABLE 1-continued

| Example | | | | |
|---|---|---|---|---|
| Example 4 | 0 | $(Li_{6.4}Ga_{0.05}Al_{0.15})La_3Zr_2O_{12}$ garnet-type | 284 | 89 |
| Example 5 | 0 | $(Li_{6.4}Ga_{0.05}Al_{0.15})La_3Zr_2O_{12}$ garnet-type | 261 | 93 |
| Example 6 | 0 | $(Li_{6.4}Ga_{0.05}Al_{0.15})La_3Zr_2O_{12}$ garnet-type | 228 | 95 |
| Example 7 | 0 | $(Li_{6.4}Ga_{0.05}Al_{0.15})La_3Zr_2O_{12}$ garnet-type | 185 | 93 |
| Example 8 | 0 | $(Li_{6.4}Ga_{0.05}Al_{0.15})La_3Zr_2O_{12}$ garnet-type | 143 | 89 |
| Example 9 | 0 | $(Li_{6.4}Ga_{0.05}Al_{0.15})La_3Zr_2O_{12}$ garnet-type | 290 | 93 |
| Example 10 | 0 | $(Li_{6.4}Ga_{0.05}Al_{0.15})La_3Zr_2O_{12}$ garnet-type | 256 | 91 |
| Example 11 | 0 | $(Li_{6.4}Ga_{0.05}Al_{0.15})La_3Zr_2O_{12}$ garnet-type | 220 | 79 |
| Example 12 | 0 | $(Li_{6.4}Ga_{0.05}Al_{0.15})La_3Zr_2O_{12}$ garnet-type | 253 | 79 |

From the results shown in Table 1, it is found that in Comparative Example 1 in which the negative electrode active material having a $\beta II$-$Li_3VO_4$-type crystal structure was used, the initial reversible capacity is so low that charging and discharging are almost impossible.

On the other hand, in Examples 1 to 12 in which the negative electrode active material layer contains 60% by volume or more of the oxide having a LISICON-type crystal structure and the solid electrolyte layer contains a solid electrolyte having the oxide having a garnet-type crystal structure, the high initial reversible capacity and the high utilization rate were obtained.

Comparative Example 2

[Preparation of Solid Electrolyte Powder]
A negative electrode active material powder was prepared in the same manner as in Example 4 except that lithium hydroxide monohydrate ($LiOH.H_2O$), germanium oxide ($GeO_2$), aluminum oxide ($Al_2O_3$), and phosphorus oxide ($P_2O_5$) were weighed so that the solid electrolyte had the composition shown in Table 2 below.

[Preparation of Negative Electrode Active Material Powder]
A negative electrode active material powder was prepared in the same manner as in Example 4.

[Preparation of All-Solid-State Battery]
An all-solid-state battery was prepared in the same manner as in Comparative Example 1.

Comparative Example 3

[Preparation of Solid Electrolyte Powder]
A negative electrode active material powder was prepared in the same manner as in Example 4 except that lithium hydroxide monohydrate ($LiOH.H_2O$), lanthanum hydroxide ($La(OH)_3$), and titanium oxide ($TiO_2$) were weighed so that the solid electrolyte had the composition shown in Table 2 below.

[Preparation of Negative Electrode Active Material Powder]
A negative electrode active material powder was prepared in the same manner as in Example 4.

[Preparation of All-Solid-State Battery]
An all-solid-state battery was prepared in the same manner as in Comparative Example 1.

Example 13

[Preparation of Solid Electrolyte Powder]
A negative electrode active material powder was prepared in the same manner as in Comparative Example 1 except that lithium hydroxide monohydrate ($LiOH.H_2O$), lanthanum hydroxide ($La(OH)_3$), zirconium oxide ($ZrO_2$), and tantalum oxide ($Ta_2O_5$) were weighed so that the solid electrolyte had the composition shown in Table 2 below.

[Preparation of Negative Electrode Active Material Powder]
A negative electrode active material powder was prepared in the same manner as in Example 4.

[Preparation of All-Solid-State Battery]
An all-solid-state battery was prepared in the same manner as in Comparative Example 1.

Example 14

[Preparation of Solid Electrolyte Powder]
A negative electrode active material powder was prepared in the same manner as in Comparative Example 1 except that lithium hydroxide monohydrate ($LiOH.H_2O$), aluminum oxide ($Al_2O_3$), lanthanum hydroxide ($La(OH)_3$), and zirconium oxide ($ZrO_2$) were weighed so that the solid electrolyte had the composition shown in Table 2 below.

[Preparation of Negative Electrode Active Material Powder]
A negative electrode active material powder was prepared in the same manner as in Example 4.

[Preparation of All-Solid-State Battery]
An all-solid-state battery was prepared in the same manner as in Comparative Example 1.

Example 15

[Preparation of Solid Electrolyte Powder]
A negative electrode active material powder was prepared in the same manner as in Comparative Example 1 except that lithium hydroxide monohydrate ($LiOH.H_2O$), gallium oxide ($Ga_2O_3$), scandium oxide ($Sc_2O_3$), lanthanum hydroxide ($La(OH)_3$), and zirconium oxide ($ZrO_2$) were weighed so that the solid electrolyte had the composition shown in Table 2 below.

[Preparation of Negative Electrode Active Material Powder]
A negative electrode active material powder was prepared in the same manner as in Example 4.

[Preparation of All-Solid-State Battery]
An all-solid-state battery was prepared in the same manner as in Comparative Example 1.

Example 16

[Preparation of Solid Electrolyte Powder]

A negative electrode active material powder was prepared in the same manner as in Comparative Example 1 except that lithium hydroxide monohydrate (LiOH.H$_2$O), lanthanum hydroxide (La(OH)$_3$), zirconium oxide (ZrO$_2$), and niobium oxide (Nb$_2$O$_5$) were weighed so that the solid electrolyte had the composition shown in Table 2 below.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1.

Example 17

[Preparation of Solid Electrolyte Powder]

A negative electrode active material powder was prepared in the same manner as in Comparative Example 1 except that lithium hydroxide monohydrate (LiOH.H$_2$O), aluminum oxide (Al$_2$O$_3$), lanthanum hydroxide (La(OH)$_3$), zirconium oxide (ZrO$_2$), and niobium oxide (Nb$_2$O$_5$) were weighed so that the solid electrolyte had the composition shown in Table 2 below.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1.

Example 18

[Preparation of Solid Electrolyte Powder]

A negative electrode active material powder was prepared in the same manner as in Comparative Example 1 except that lithium hydroxide monohydrate (LiOH.H$_2$O), aluminum oxide (Al$_2$O$_3$), lanthanum hydroxide (La(OH)$_3$), zirconium oxide (ZrO$_2$), and bismuth oxide (Bi$_2$O$_3$) were weighed so that the solid electrolyte had the composition shown in Table 2 below.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1.

Example 19

[Preparation of Solid Electrolyte Powder]

A negative electrode active material powder was prepared in the same manner as in Comparative Example 1 except that lithium hydroxide monohydrate (LiOH.H$_2$O), germanium oxide (GeO$_2$), and phosphorus oxide (P$_2$O$_5$) were weighed so that the solid electrolyte had the composition shown in Table 2 below.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1.

Example 20

[Preparation of Solid Electrolyte Powder]

A negative electrode active material powder was prepared in the same manner as in Comparative Example 1 except that lithium hydroxide monohydrate (LiOH.H$_2$O), silicon oxide (SiO$_2$), and phosphorus oxide (P$_2$O$_5$) were weighed so that the solid electrolyte had the composition shown in Table 2 below.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1.

Example 21

[Preparation of Solid Electrolyte Powder]

A negative electrode active material powder was prepared in the same manner as in Comparative Example 1 except that lithium hydroxide monohydrate (LiOH.H$_2$O), vanadium pentoxide (V$_2$O$_5$), and silicon oxide (SiO$_2$) were weighed so that the solid electrolyte had the composition shown in Table 2 below.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1.

Example 22

[Preparation of Solid Electrolyte Powder]

A negative electrode active material powder was prepared in the same manner as in Comparative Example 1 except that lithium hydroxide monohydrate (LiOH.H$_2$O), gallium oxide (Ga$_2$O$_3$), aluminum oxide (Al$_2$O$_3$), lanthanum hydroxide (La(OH)$_3$), zirconium oxide (ZrO$_2$), vanadium pentoxide (V$_2$O$_5$), silicon oxide (SiO$_2$), and boron oxide (B$_2$O$_3$) were weighed so that the solid electrolyte had the composition shown in Table 2 below.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1.

(Evaluation)

The all-solid-state batteries prepared in Examples 13 to 22 and Comparative Examples 2 and 3 were evaluated in the same manner as in Example 1 and the like, and the initial reversible capacity and the utilization rate were calculated.

TABLE 2

| | Negative electrode | | | | |
|---|---|---|---|---|---|
| | Negative electrode active material | Conductive auxiliary | Sintering auxiliary | Negative electrode active material (vol %) | Conductive auxiliary (vol %) |
| Comparative Example 2 | $Li_{3.2}(V_{0.8}Si_{0.2})O_4$ LISICON-type | Ag | — | 60 | 40 |
| Comparative Example 3 | $Li_{3.2}(V_{0.8}Si_{0.2})O_4$ LISICON-type | Ag | — | 60 | 40 |
| Example 13 | $Li_{3.2}(V_{0.8}Si_{0.2})O_4$ LISICON-type | Ag | — | 60 | 40 |
| Example 14 | $Li_{3.2}(V_{0.8}Si_{0.2})O_4$ LISICON-type | Ag | — | 60 | 40 |
| Example 15 | $Li_{3.2}(V_{0.8}Si_{0.2})O_4$ LISICON-type | Ag | — | 60 | 40 |
| Example 16 | $Li_{3.2}(V_{0.8}Si_{0.2})O_4$ LISICON-type | Ag | — | 60 | 40 |
| Example 17 | $Li_{3.2}(V_{0.8}Si_{0.2})O_4$ LISICON-type | Ag | — | 60 | 40 |
| Example 18 | $Li_{3.2}(V_{0.8}Si_{0.2})O_4$ LISICON-type | Ag | — | 60 | 40 |
| Example 19 | $Li_{3.2}(V_{0.8}Si_{0.2})O_4$ LISICON-type | Ag | — | 60 | 40 |
| Example 20 | $Li_{3.2}(V_{0.8}Si_{0.2})O_4$ LISICON-type | Ag | — | 60 | 40 |
| Example 21 | $Li_{3.2}(V_{0.8}Si_{0.2})O_4$ LISICON-type | Ag | — | 60 | 40 |
| Example 22 | $Li_{3.2}(V_{0.8}Si_{0.2})O_4$ LISICON-type | Ag | — | 60 | 40 |

| | Negative electrode Sintering auxiliary (vol %) | Solid electrolyte layer | Initial reversible capacity (mAh/g) | Utilization rate (%) |
|---|---|---|---|---|
| Comparative Example 2 | 0 | $Li_{1.5}Ge_{1.5}Al_{0.5}(PO_4)_3$ NASICON-type | 5 or less | — |
| Comparative Example 3 | 0 | $Li_{0.3}La_{0.57}TiO_3$ perovskite-type | 5 or less | — |
| Example 13 | 0 | $Li_{8.8}La_3(Zr_{1.0}Ta_{0.4})O_{12}$ garnet-type | 272 | 85 |
| Example 14 | 0 | $(Li_{0.4}Al_{0.2})La_3Zr_2O_{12}$ garnet-type | 256 | 80 |
| Example 15 | 0 | $(Li_{0.4}Ga_{0.15}So_{0.05})La_3Zr_2O_{12}$ garnet-type | 289 | 90 |
| Example 16 | 0 | $Li_{6.75}La_3Zr_{1.75}Nb_{0.25}O_{12}$ garnet-type | 275 | 86 |
| Example 17 | 0 | $(Li_{0.45}Al_{0.1})La_3(Zr_{1.75}Nb_{0.25})O_{12}$ garnet-type | 265 | 83 |
| Example 18 | 0 | $(Li_{0.45}Al_{0.1})La_3(Zr_{1.75}B_{0.25})O_{12}$ garnet-type | 270 | 84 |
| Example 19 | 0 | $Li_{3.5}(Ga_{0.5}P_{0.5})O_4$ LISICON-type | 251 | 78 |
| Example 20 | 0 | $Li_{3.5}(Si_{0.5}P_{0.5})O_4$ LISICON-type | 220 | 69 |
| Example 21 | 0 | $Li_{3.2}(V_{0.8}Si_{0.2})O_4$ LISICON-type | 242 | 76 |
| Example 22 | 0 | $47.5((Li_{6.4}Ga_{0.05}Al_{0.15})La_3Zr_2O_{12})$-$47.5(Li_{2.5}(V_{0.0}Si_{0.2})O_4)$-$5(Li_3BO_3)$ garnet-type + LISICON-type + Li—B—O compound | 261 | 82 |

In Table 2, $(Li_{6.4}Ga_{0.05}Al_{0.15})La_3Zr_2O_{12}$ is the solid electrolyte having a garnet-type crystal structure, and $(Li_{3.2}(V_{0.8}Si_{0.2})O_4$ is the solid electrolyte having a LISICON-type crystal structure.

From the results shown in Table 2, it is found that in Comparative Example 2 in which the solid electrolyte has a NASICON-type crystal structure and Comparative Example 3 in which the solid electrolyte has a perovskite-type crystal structure, the initial reversible capacity is so low that charging and discharging are almost impossible.

On the other hand, in Examples 13 to 22 in which the solid electrolyte layer contains a solid electrolyte having the oxide having a garnet-type or LISICON-type crystal structure, the high initial reversible capacity and the high utilization rate were obtained.

Example 23

[Preparation of Solid Electrolyte Powder]
A solid electrolyte powder was prepared in the same manner as in Example 4.

[Preparation of Negative Electrode Active Material Powder]
A negative electrode active material powder was prepared in the same manner as in Example 4.

[Preparation of All-Solid-State Battery]

An all-solid-state battery was prepared in the same manner as in Comparative Example 1 except that no conductive auxiliary agent was used.

Example 24

[Preparation of Solid Electrolyte Powder]

A solid electrolyte powder was prepared in the same manner as in Example 19.

[Preparation of Negative Electrode Active Material Powder]

A negative electrode active material powder was prepared in the same manner as in Example 19.

[Preparation of All-Solid-State Battery]

An all-solid-state battery was prepared in the same manner as in Comparative Example 1 except that no conductive auxiliary agent was used.

(Evaluation)

The all-solid-state batteries prepared in Examples 23 to 24 were evaluated in the same manner as in Example 1 and the like, and the initial reversible capacity and the utilization rate were calculated.

TABLE 3

| | Negative electrode | | | |
|---|---|---|---|---|
| | Negative electrode active material | Conductive auxiliary | Sintering auxiliary | Negative electrode active material (vol %) | Conductive auxiliary (vol %) |
| Example 23 | $Li_{3.2}(V_{0.8}Si_{0.2})O_4$ LISICON-type | — | — | 100 | 0 |
| Example 24 | $Li_{3.2}(V_{0.8}Si_{0.2})O_4$ LISICON-type | — | — | 100 | 0 |

| | Negative electrode Sintering auxiliary (vol %) | Solid electrolyte layer | Initial reversible capacity (mAh/g) | Utilization rate (%) |
|---|---|---|---|---|
| Example 23 | 0 | $(Li_{6.4}Ga_{0.05}Al_{0.15})La_3Zr_2O_{12}$ garnet-type | 161 | 50 |
| Example 24 | 0 | $Li_{3.5}(Ge_{0.5}P_{0.5})O_4$ LISICON-type | 135 | 42 |

From the results shown in Table 3, it is found that the initial reversible capacity and the utilization rate can be obtained even when the negative electrode active material layer includes only the oxide having a LISICON-type crystal structure.

Example 25

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 4.

[Preparation of All-Solid-State Battery]

An all-solid-state battery was prepared in the same manner as in Comparative Example 1 except that the mixing ratio between the negative electrode active material and the conductive auxiliary agent was set to the ratio shown in Table 4.

Example 26

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

[Preparation of All-Solid-State Battery]

An all-solid-state battery was prepared in the same manner as in Comparative Example 1 except that $Li_3BO_3$ was used as a sintering auxiliary agent and that the mixing ratio between the negative electrode active material, the conductive auxiliary agent, and the sintering auxiliary agent was set to the ratio shown in Table 4.

Example 27

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

[Preparation of All-Solid-State Battery]

An all-solid-state battery was prepared in the same manner as in Comparative Example 1 except that the carbon nanofiber (VGCF (registered trademark)) was used as a conductive auxiliary agent and that the mixing ratio between the negative electrode active material, the conductive auxiliary agent, and the sintering auxiliary agent was set to the ratio shown in Table 4.

Example 28

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

17

[Preparation of All-Solid-State Battery]

An all-solid-state battery was prepared in the same manner as in Example 27 except that the mixing ratio between the negative electrode active material, the conductive auxiliary agent, and the sintering auxiliary agent was set to the ratio shown in Table 4.

Example 29

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

[Preparation of All-Solid-State Battery]

An all-solid-state battery was prepared in the same manner as in Comparative Example 1 except that $B_2O_3$ was used as a sintering auxiliary agent and that the mixing ratio between the negative electrode active material, the conductive auxiliary agent, and the sintering auxiliary agent was set to the ratio shown in Table 4.

Example 30

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

[Preparation of All-Solid-State Battery]

An all-solid-state battery was prepared in the same manner as in Comparative Example 1 except that $LiBO_2$ was used as a sintering auxiliary agent and that the mixing ratio between the negative electrode active material, the conductive auxiliary agent, and the sintering auxiliary agent was set to the ratio shown in Table 4.

Example 31

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

18

[Preparation of All-Solid-State Battery]

An all-solid-state battery was prepared in the same manner as in Comparative Example 1 except that $Li_{2.4}Al_{0.2}BO_3$ was used as a sintering auxiliary agent and that the mixing ratio between the negative electrode active material, the conductive auxiliary agent, and the sintering auxiliary agent was set to the ratio shown in Table 4.

Example 32

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

[Preparation of All-Solid-State Battery]

An all-solid-state battery was prepared in the same manner as in Comparative Example 1 except that $Li_{2.2}C_{0.8}B_{0.2}O_3$ was used as a sintering auxiliary agent and that the mixing ratio between the negative electrode active material, the conductive auxiliary agent, and the sintering auxiliary agent was set to the ratio shown in Table 4.

Example 33

[Preparation of Solid Electrolyte Powder]

A solid electrolyte powder was prepared in the same manner as in Example 23.

[Preparation of Negative Electrode Active Material Powder]

A negative electrode active material powder was prepared in the same manner as in Example 25.

[Preparation of All-Solid-State Battery]

An all-solid-state battery was prepared in the same manner as in Comparative Example 1 except that $Li_4B_2O_5$ was used as a sintering auxiliary agent and that the mixing ratio between the negative electrode active material, the conductive auxiliary agent, and the sintering auxiliary agent was set to the ratio shown in Table 4.

(Evaluation)

The all-solid-state batteries prepared in Examples 25 to 33 were evaluated in the same manner as in Example 1 and the like, and the initial reversible capacity and the utilization rate were calculated.

TABLE 4

| | Negative electrode | | | | | | | Initial reversible capacity (mAh/g) | Utilization rate (%) |
|---|---|---|---|---|---|---|---|---|---|
| | Negative electrode active material (X) | Conductive auxiliary (Y) | Sintering auxiliary (Z) | X (vol %) | Y (vol %) | Z (vol %) | Solid electrolyte layer | | |
| Example 25 | $Li_{3.2}(V_{0.8}Si_{0.2})O_4$ LISICON-type | Ag | — | 70 | 30 | 0 | $(Li_{6.4}Ga_{0.05}Al_{0.15})La_3Zr_2O_{12}$ garnet-type | 260 | 81 |
| Example 26 | $Li_{3.2}(V_{0.8}Si_{0.2})O_4$ LISICON-type | Ag | $Li_3BO_3$ | 65 | 30 | 5 | $(Li_{6.4}Ga_{0.05}Al_{0.15})La_3Zr_2O_{12}$ garnet-type | 275 | 86 |
| Example 27 | $Li_{3.2}(V_{0.8}Si_{0.2})O_4$ LISICON-type | VGCF | $Li_3BO_3$ | 75 | 10 | 15 | $(Li_{6.4}Ga_{0.05}Al_{0.15})La_3Zr_2O_{12}$ garnet-type | 277 | 87 |
| Example 28 | $Li_{3.2}(V_{0.8}Si_{0.2})O_4$ LISICON-type | VGCF | $Li_3BO_3$ | 80 | 10 | 10 | $(Li_{6.4}Ga_{0.05}Al_{0.15})La_3Zr_2O_{12}$ garnet-type | 261 | 82 |
| Example 29 | $Li_{3.2}(V_{0.8}Si_{0.2})O_4$ LISICON-type | Ag | $B_2O_3$ | 65 | 30 | 5 | $(Li_{6.4}Ga_{0.05}Al_{0.15})La_3Zr_2O_{12}$ garnet-type | 129 | 40 |

TABLE 4-continued

| | Negative electrode | | | | | | | Initial reversible capacity (mAh/g) | Utilization rate (%) |
| --- | --- | --- | --- | --- | --- | --- | --- | --- | --- |
| | Negative electrode active material (X) | Conductive auxiliary (Y) | Sintering auxiliary (Z) | X (vol %) | Y (vol %) | Z (vol %) | Solid electrolyte layer | | |
| Example 30 | $Li_{3.2}(V_{0.8}Si_{0.2})O_4$ LISICON-type | Ag | $Li_3BO_3$ | 65 | 30 | 5 | $(Li_{6.4}Ga_{0.05}Al_{0.15})La_3Zr_2O_{12}$ garnet-type | 214 | 67 |
| Example 31 | $Li_{3.2}(V_{0.8}Si_{0.2})O_4$ LISICON-type | Ag | $Li_{2.4}Al_{0.2}BO_3$ | 65 | 30 | 5 | $(Li_{6.4}Ga_{0.05}Al_{0.15})La_3Zr_2O_{12}$ garnet-type | 285 | 89 |
| Example 32 | $Li_{3.2}(V_{0.8}Si_{0.2})O_4$ LISICON-type | Ag | $Li_{2.3}C_{0.8}B_{0.2}O_3$ | 65 | 30 | 5 | $(Li_{6.4}Ga_{0.05}Al_{0.15})La_3Zr_2O_{12}$ garnet-type | 270 | 84 |
| Example 33 | $Li_{3.2}(V_{0.8}Si_{0.2})O_4$ LISICON-type | Ag | $Li_4B_2O_5$ | 65 | 30 | 5 | $(Li_{6.4}Ga_{0.05}Al_{0.15})La_3Zr_2O_{12}$ garnet-type | 264 | 83 |

From the results shown in Table 4, it is found that the high initial reversible capacity and the high utilization rate can be obtained even when the conductive auxiliary agent or the sintering auxiliary agent is added to the negative electrode active material layer. Furthermore, from the results shown in Examples 29 to 33, it is found that the enhanced initial reversible capacity can be realized by using the sintering auxiliary agent having a molar ratio of Li to B (Li/B) of 2.0 or more.

The all-solid-state battery according to the present embodiment includes a positive electrode, a negative electrode having a negative electrode active material layer, and a solid electrolyte layer between the positive electrode and the negative electrode material layer. The negative electrode active material layer contains 60% by volume or more of an oxide having a LISICON-type crystal structure.

The solid electrolyte layer contains a solid electrolyte having at least one of an oxide having a garnet-type crystal structure or an oxide having a LISICON-type crystal structure.

In this case, the oxide having a LISICON-type crystal structure functions as a negative electrode active material, and charging and discharging are possible without a solid electrolyte separately added to the negative electrode active material. For this reason, the content of the oxide having a LISICON-type crystal structure that functions as a negative electrode active material can be increased. Therefore, the energy density of the all-solid-state battery can be increased.

In the present embodiment, the word "solid electrolyte" refers to a substance having an ionic conductivity of $1 \times 10^{-5}$ S/cm or more.

In the all-solid-state battery according to the present embodiment, the oxide having a LISICON-type crystal structure contained in the negative electrode active material layer is preferably represented by a chemical formula of $(Li_{[3-ax+(5-b)y]}A_x)(V_{(1-y)}B_y)O_4$, wherein A is at least one element selected from the group consisting of Na, K, Mg, Ca, Al, Ga, Zn, Fe, Cr, and Co, B is at least one element selected from the group consisting of Zn, Al, Ga, Si, Ge, Sn, P, As, Ti, Mo, W, Fe, Cr, and Co, 0≤x≤1.0, 0≤y≤0.6, a represents a valence of A, and b represents a valence of B.

In the chemical formula, it is more preferable that 0≤x≤0.2 and 0.1≤y≤0.4.

In the all-solid-state battery according to the present embodiment, the negative electrode active material layer preferably further contains a conductive auxiliary agent.

In the all-solid-state battery according to the present embodiment, the negative electrode active material layer preferably further contains a sintering auxiliary agent.

The invention claimed is:

1. An all-solid-state battery comprising:
   a positive electrode;
   a negative electrode having a negative electrode active material layer, the negative electrode active material layer containing 75% by volume or more of an oxide having a LISICON-type crystal structure as a negative electrode active material and not containing any additional negative electrode active material therein; and
   a solid electrolyte layer between the positive electrode and the negative electrode material layer, the solid electrolyte layer containing a solid electrolyte having at least one of an oxide having a garnet-type crystal structure or an oxide having a LISICON-type crystal structure.

2. The all-solid-state battery according to claim 1, wherein the oxide having a LISICON-type crystal structure contained in the negative electrode active material layer is represented by $(Li_{[3-ax+(5-b)y]}A_x)(V_{(1-y)}B_y)O_4$, wherein A is at least one element selected from Na, K, Mg, Ca, Al, Ga, Zn, Fe, Cr, and Co, B is at least one element selected from Zn, Al, Ga, Si, Ge, Sn, P, As, Ti, Mo, W, Fe, Cr, and Co, 0≤x≤1.0, 0≤y≤0.6, a represents a valence of A, and b represents a valence of B.

3. The all-solid-state battery according to claim 2, wherein 0≤x≤0.2 and 0.1≤y≤0.4.

4. The all-solid-state battery according to claim 1, wherein the negative electrode active material layer further contains a conductive auxiliary agent.

5. The all-solid-state battery according to claim 4, wherein the conductive auxiliary agent includes at least one of Ag, Cu, Ni, Sn, carbon nanofibers, acetylene black, and Ketjen black.

6. The all-solid-state battery according to claim 4, wherein the negative electrode active material layer further contains a sintering auxiliary agent.

7. The all-solid-state battery according to claim 6, wherein the sintering auxiliary agent is a boron-lithium complex oxide having a molar ratio of Li to B (Li/B) of 2.0 or more.

8. The all-solid-state battery according to claim 6, wherein the conductive auxiliary agent includes at least one of Ag, Cu, Ni, Sn, carbon nanofibers, acetylene black, and Ketjen black, and the sintering auxiliary agent is a boron-lithium complex oxide having a molar ratio of Li to B (Li/B) of 2.0 or more.

9. The all-solid-state battery according to claim 1, wherein the negative electrode active material layer further contains a sintering auxiliary agent.

10. The all-solid-state battery according to claim 9, wherein the sintering auxiliary agent is a boron-lithium complex oxide having a molar ratio of Li to B (Li/B) of 2.0 or more.

11. The all-solid-state battery according to claim 1, wherein the oxide having the LISICON-type crystal structure as the solid electrolyte is represented by $(Li_{[3-ax+(5-b)y]}A_x)(V_{(1-y)}B_y)O_4$, wherein A is at least one element selected from Na, K, Mg, Ca, Al, Ga, Zn, Fe, Cr, and Co, B is at least one element selected from Zn, Al, Ga, Si, Ge, Sn, P, As, Ti, Mo, W, Fe, Cr, and Co, $0 \leq x \leq 1.0$, $0 \leq y \leq 0.6$, a represents a valence of A, and b represents a valence of B.

12. The all-solid-state battery according to claim 11, wherein $0 \leq x \leq 0.2$ and $0.1 \leq y \leq 0.4$.

13. The all-solid-state battery according to claim 1, wherein the oxide having the garnet-type structure as the solid electrolyte is represented by $(Li_{[7-ax+(b-4)y]}A_x)La_3Zr_{(2-y)}B_yO_{12}$, wherein A is at least one element selected from Ga, Al, Mg, Zn, and Sc, B is at least one element selected from Nb, Ta, W, Te, Mo, and Bi, $0 \leq x \leq 0.5$, $0 \leq y \leq 2.0$, a represents an average valence of A, and b represents an average valence of B.

* * * * *